(12) United States Patent
Malleni

(10) Patent No.: US 12,175,226 B2
(45) Date of Patent: Dec. 24, 2024

(54) PROVISIONING BARE METAL MACHINES WITH A COMPLEX SOFTWARE PRODUCT

(71) Applicant: Red Hat, Inc., Raleigh, NC (US)

(72) Inventor: Sai Sindhur Malleni, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 50 days.

(21) Appl. No.: 17/184,277

(22) Filed: Feb. 24, 2021

(65) Prior Publication Data

US 2022/0269494 A1 Aug. 25, 2022

(51) Int. Cl.
G06F 9/445 (2018.01)
G06F 8/61 (2018.01)
G06F 9/4401 (2018.01)

(52) U.S. Cl.
CPC .............. *G06F 8/61* (2013.01); *G06F 9/4416* (2013.01)

(58) Field of Classification Search
CPC ....... G06F 9/45541; G06F 9/4416; G06F 8/61
See application file for complete search history.

(56) References Cited

U.S. PATENT DOCUMENTS

| | | | | |
|---|---|---|---|---|
| 2008/0127172 | A1* | 5/2008 | Dawson | G06F 8/61 717/174 |
| 2010/0287363 | A1* | 11/2010 | Thorsen | G06F 9/4406 713/2 |
| 2013/0205292 | A1* | 8/2013 | Levijarvi | G06F 8/61 717/177 |
| 2015/0186124 | A1* | 7/2015 | Hoy | G06F 21/51 717/174 |
| 2015/0207625 | A1* | 7/2015 | Sathaye | H04L 9/0894 726/26 |
| 2017/0003950 | A1* | 1/2017 | Newell | G06F 8/65 |
| 2018/0060051 | A1* | 3/2018 | Ramalingam | H04L 67/34 |
| 2019/0020540 | A1 | 1/2019 | Yen et al. | |
| 2019/0334909 | A1* | 10/2019 | Schmitt | H04L 63/10 |

OTHER PUBLICATIONS

Srinivas, Sesha Sai, et al., "Performance Evaluation of OpenStack Deployment Tools," Department of Communication Systems, Blekinge Institute of Technology, Thesis No. MSEE-2016:42, 2016, 49 pages.

* cited by examiner

*Primary Examiner* — S. Sough
*Assistant Examiner* — Mohammad H Kabir
(74) *Attorney, Agent, or Firm* — Dority & Manning, P.A.

(57) ABSTRACT

Provisioning bare metal machines with a complex software product is disclosed. A request to install a software product is received. Based on information contained in the request, a subset of computing devices from a set of computing devices are identified. An operating system is caused to be installed on a first computing device of the subset of computing devices. Boot information on a second computing device and a third computing device of the subset of computing devices is modified to cause the second computing device and the third computing device to, upon being booted, request an operating system from the first computing device. A software product installer configured to install the software product is caused to be installed on the first computing device.

20 Claims, 13 Drawing Sheets

BARE METAL COMPLEX SOFTWARE PRODUCT PROVISIONER

ALLOCATION 5

| | CONTROLLER NODE | WORKER NODE | BOOT STRAP NODE |
|---|---|---|---|
| COMPUTING DEVICE 4 | ☒ | ☐ | ☐ |
| COMPUTING DEVICE 5 | ☒ | ☐ | ☐ |
| COMPUTING DEVICE 6 | ☐ | ☒ | ☐ |
| COMPUTING DEVICE 7 | ☒ | ☐ | ☐ |
| COMPUTING DEVICE 8 | ☐ | ☒ | ☐ |
| COMPUTING DEVICE 9 | ☐ | ☐ | ☒ |

Tooltip (122): INTEL I9-9900K / 32 (4X8) GB DDR4-3600 / DISK 1: 1 TB SSD / DISK 2: 512GB HDD

ADDITIONAL CONFIGURATION OPTIONS

```
ASDFSAFD/33;
WEETT:12;
RTTT/TTTT/TTT.EXE;
```

[SUBMIT]

*FIG. 6B*

PROVISIONING BARE METAL MACHINES WITH A COMPLEX SOFTWARE PRODUCT

BACKGROUND

Installing complex software products that involve the installation of operating systems on bare metal machines can require a relatively high level of technical expertise, as well as detailed knowledge of various parameters of the bare metal machines and detailed knowledge of the particular software product. A small typographical error or other mistake made during the installation process can prevent the software product from being installed correctly. Diagnosing the problem to determine why the software product is not operating correctly can take a substantial amount of time.

SUMMARY

The examples disclosed herein implement automated provisioning of bare metal machines with a complex software product.

In one example, a method is provided. The method includes receiving, by a bare metal installer executing on a processor device, a request to install a software product. The method further includes, based on information contained in the request, identifying a subset of computing devices from a set of computing devices. The method further includes causing, by the bare metal installer, an operating system to be installed on a first computing device of the subset of computing devices. The method further includes modifying, by the bare metal installer, boot information on a second computing device and a third computing device of the subset of computing devices to cause the second computing device and the third computing device to, upon being booted, request an operating system from the first computing device. The method further includes causing a software product installer configured to install the software product to be installed on the first computing device.

In another example, a computing device is provided. The computing device includes a memory and a processor device coupled to the memory. The processor device is to receive a request to install a software product. The processor device is further to, based on information contained in the request, identify a subset of computing devices from a set of computing devices. The processor device is further to cause an operating system to be installed on a first computing device of the subset of computing devices. The processor device is further to modify boot information on a second computing device and a third computing device of the subset of computing devices to cause the second computing device and the third computing device to, upon being booted, request an operating system from the first computing device. The processor device is further to cause a software product installer configured to install the software product to be installed on the first computing device. The processor device is further to initiate the software product installer to install the software product on the subset of computing devices.

In another example, a non-transitory computer-readable storage medium is provided. The non-transitory computer-readable storage medium includes executable instructions to cause a processor device to receive a request to install a software product. The executable instructions further cause the processor device to, based on information contained in the request, identify a subset of computing devices from a set of computing devices. The executable instructions further cause the processor device to cause an operating system to be installed on a first computing device of the subset of computing devices. The executable instructions further cause the processor device to modify boot information on a second computing device and a third computing device of the subset of computing devices to cause the second computing device and the third computing device to, upon being booted, request an operating system from the first computing device. The executable instructions further cause the processor device to cause a software product installer configured to install the software product to be installed on the first computing device. The executable instructions further cause the processor device to initiate the software product installer to install the software product on the subset of computing devices.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 6B illustrates the user interface illustrated in FIG. 6A at a subsequent point in time;

DETAILED DESCRIPTION

Figure 1A:
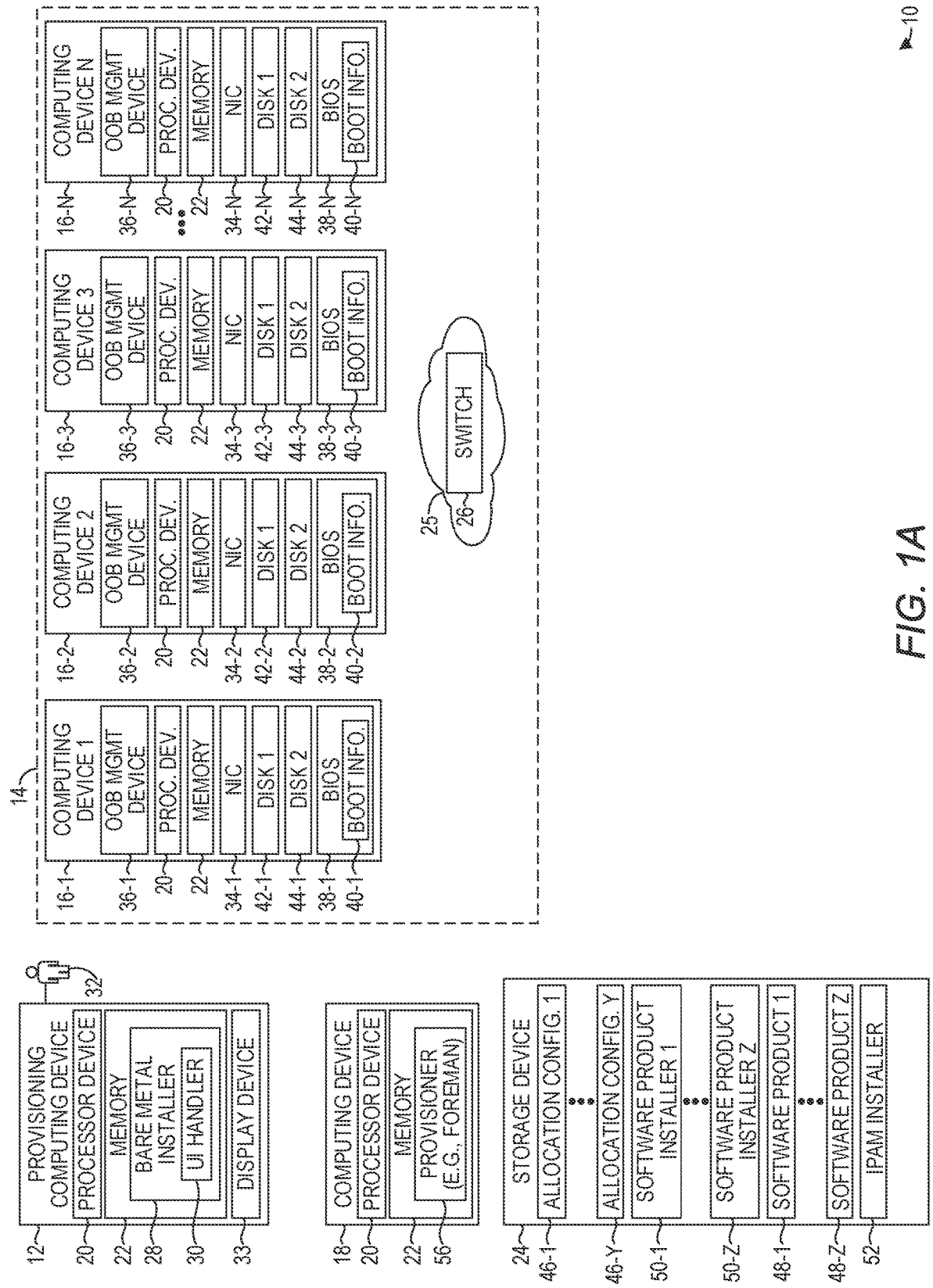
FIGS. 1A-1D are block diagrams of an environment at different points in time illustrating an example for provisioning bare metal machines with a complex software product according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Installing complex software products that involve the installation of operating systems on bare metal machines can require a relatively high level of technical expertise, as well as detailed knowledge of various parameters of the bare metal machines and detailed knowledge of the particular software product. A small typographical error or other mistake made during the installation process can prevent the software product from being installed correctly. Diagnosing the problem to determine why the software product is not operating correctly can take a substantial amount of time. The process can be sufficiently intimidating that individuals often choose simply to not do it, or to pay someone to do it. Even experienced individuals can, from time to time, make a small mistake during the process, resulting in a substantial loss of time. In a testing environment, this process may need to be repeated often, increasing the time and costs associated with testing new releases of the software product.

The examples disclosed herein implement automated provisioning of bare metal machines with a complex software product. A bare metal installer receives information that identifies a subset of computing devices from a set of computing devices. The bare metal installer selects one of the computing devices as a bootstrap node computing device and causes an operating system to be installed on the bootstrap node computing device. The bare metal installer modifies the other computing devices in the subset of computing devices so that the computing devices will boot from the bootstrap node computing device. The bare metal installer generates configuration files that will be used by the software product installer that identifies the other computing devices and other pertinent information relating to the installation of the software product on the computing devices. The bare metal installer causes a software product installer to be installed on the bootstrap node computing device and initiates the software product installer to thereby cause the software product to be installed on the subset of computing devices.

Among other advantages, the examples eliminate a need for an individual to know the intricate details otherwise needed for each of the bare metal machines, such as network interface details and out-of-band management device details, and eliminate the possibility of inadvertently using incorrect information during the provisioning process. The examples facilitate a rapid, reliable mechanism for provisioning a plurality of bare metal machines with a complex software product that can be repeated as often as needed with a minimum amount of effort by an individual.

FIGS. 1A-1D are block diagrams of an environment 10 at different points in time illustrating the provisioning of bare metal machines with a complex software product according to one implementation. Referring first to FIG. 1A, the environment 10 includes a provisioning computing device 12, a set 14 of computing devices 16-1-16-N (generally, computing devices 16), and a computing device 18, each of which includes a processor device 20 and a memory 22. The term "provisioning" in the phrase "provisioning computing device 12" is simply to easily distinguish the provisioning computing device 12 from the computing devices 16. The provisioning computing device 12 also includes, or is communicatively coupled to, one or more storage devices 24. The provisioning computing device 12, the computing device 18 and the computing devices 16 may be able to communicate with one another via one or more networks 25, which may include one or more switches 26.

The provisioning computing device 12 includes a bare metal installer 28 that is configured to, as discussed in greater detail below, provision a subset of the computing devices 16 with a complex software product. In some implementations, the bare metal installer 28 may include a user interface (UI) handler 30 to facilitate interactions with a user 32. It is noted that because the bare metal installer 28 is a component of the provisioning computing device 12, functionality implemented by the bare metal installer 28 may be attributed to the provisioning computing device 12 generally. Moreover, in examples where the bare metal installer 28 comprises software instructions that program the processor device 20 to carry out functionality discussed herein, functionality implemented by the bare metal installer 28 may be attributed herein to the processor device 20. The provisioning computing device 12 may also include a display device 33 for presenting information to the user 32.

The term "bare metal" as used herein refers to a computing device that, to be functional, requires the installation of an operating system. The term "complex software product" as used herein refers to a software implementation that includes software that, during the software installation process, involves installing and configuring portions of the software on multiple computing devices 16.

The computing devices 16-1-16-N may comprise any number of computing devices, such as tens, hundreds, or thousands of computing devices. The computing devices 16-1-16-N each have a network interface card (NIC) 34-1-34-Z that is coupled to the one or more switches 26, and which facilitates communications with other computing devices. The computing devices 16-1-16-N are each associated with a corresponding out-of-band (OOB) management device 36-1-36-N (generally, OOB management devices 36). In some implementations, the OOB management devices 36 may be electronic cards installed in the same chassis as the computing devices 16. Each OOB management device 36 contains a network interface card (not illustrated) or other communications interface that is separate from the network interface card 34 of the computing device 16 with which the OOB management device 36 is associated. The OOB management device 36 is configured to, upon request, instruct the computing device 16 with which the OOB management device 36 is associated to power on, power off, or restart. Each OOB management device 36 may also have a separate power supply than that of the computing device 16 with which the OOB management device 36 is associated.

The computing devices 16-1-16-N each have a BIOS 38-1-38-N, which boot the corresponding computing devices 16-1-16-N based on information contained in boot information 40-1-40-N. Booting, as used herein, refers to how a computing device 16 loads an operating system during its startup process. The computing devices 16-1-16-N include, or are communicatively coupled to, one or more storage devices such as disks 42-1-42-N, 44-1-44-N.

The storage device 24 includes a plurality of allocation configurations 46-1-46-Y (generally, allocation configurations 46). Each allocation configuration 46 contains information that identifies a subset of the computing devices 16, and information about each computing device 16, as discussed in greater detail below. The storage device 24 includes a plurality of complex software products 48-1-48-Z (generally, software products 48), and corresponding software product installers 50-1-50-Z (generally, software product installers 50) which are configured to, when initiated, install the corresponding software products 48-1-48-Z on a plurality of the computing devices 16. The storage device 24 also includes an internet protocol (IP) address management (IPAM) installer 52 which, for example, facilitates Domain Name System (DNS) services and Dynamic Host Configuration Protocol (DHCP) services. It is noted that the allocation configurations 46, software product installers 50, software products 48, and IPAM installer 52 are illustrated as being on a single storage device; however, in other implementations, the allocation configurations 46, software product installers 50, software products 48, and IPAM installer 52 may be stored on different storage devices.

The computing device 18 includes a software provisioner 56 that is configured to, upon request, provision a computing device 16 with an operating system. In some implementations, the provisioner 56 may comprise the Foreman lifecycle management tool available at theforeman.org.

An example use case of provisioning a subset of the computing devices 16 with a complex software product 48 will now be discussed. Assume that the user 32 interacts with the UI handler 30 of the bare metal installer 28 to request that the software product 48-1 be installed on the computing devices 16-1, 16-2, and 16-3. In some implementations, the user 32 may enter allocation information, such as an allocation identifier, that identifies a particular allocation configuration 46, such as, in this example, the allocation configuration 46-1.

The bare metal installer 28 accesses the allocation configuration 46-1 and determines that the allocation configuration 46-1 identifies the computing devices 16-1, 16-2, and 16-3. The allocation configuration 46-1 contains information about each of the computing devices 16-1, 16-2, and 16-3, including, by way of non-limiting example, the fully qualified domain name, a network interface identifier, such as a media access control (MAC) address of the corresponding NIC 34, that identifies a corresponding network interface via which the corresponding computing device 16 can communicate via a network, an OOB interface address, such as a MAC address or other address of the corresponding OOB management device 36, information about the corresponding processor device 20 and corresponding memory 22, information about the corresponding disks 42 and 44, and authentication information necessary to interact with the corresponding computing device 16.

The bare metal installer 28 determines one of the computing devices 16-1, 16-2, and 16-3 to be a "bootstrap node" computing device from which the other computing devices 16 will seek operating system information during the boot process, and on which the software product installer 50-1 will ultimately be installed. The user 32 may identify a particular computing device 16-1, 16-2, or 16-3 to the bare metal installer 28 to serve as the bootstrap node computing device, or the bare metal installer 28 may select a particular computing device 16-1, 16-2 or 16-3 to serve as the bootstrap node computing device. The bare metal installer 28 may select the bootstrap node computing device randomly, or based on some criteria, such as which computing device 16-1, 16-2, or 16-3 has a greatest capability based on the information in the allocation configuration 46-1 regarding the processor devices 20, the memories 22 and the disks 42 and 44 of each of the computing devices 16-1, 16-2, and 16-3. In this example, assume that the bare metal installer 28 determines the computing device 16-1 to be the bootstrap node computing device. It is noted that the bootstrap node computing device 16-1 may ultimately have the complex software product installed on the bootstrap node computing device 16-1 and be part of the subset of computing devices 16-1-16-3 that implement the complex software product, or, in other implementations, may not ultimately have the complex software product installed, and be used simply to cause the installation of the complex software product on the other computing devices 16-2 and 16-3.

Figure 1B:
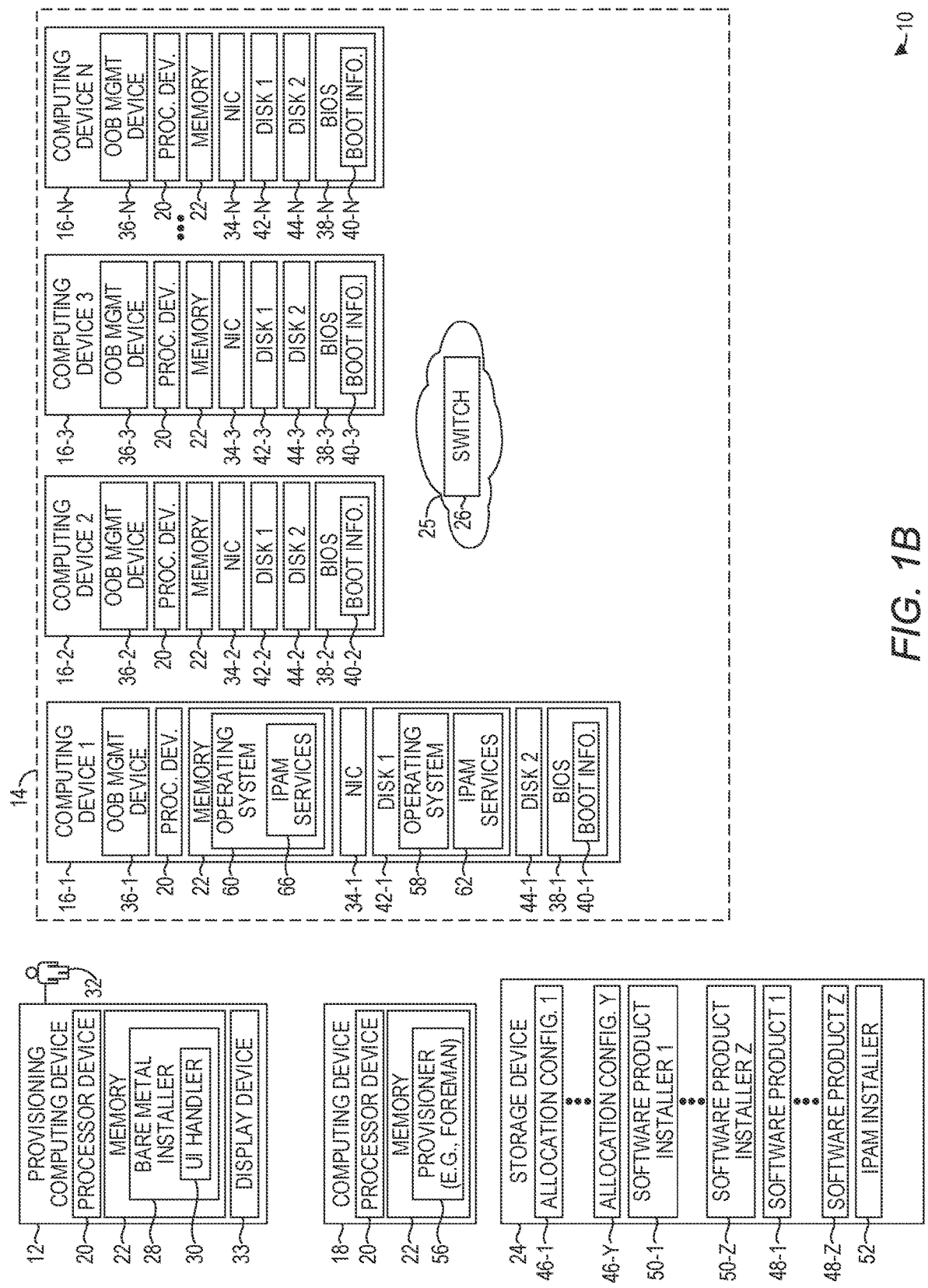

Referring now to FIG. 1B, the bare metal installer 28 provides information to the provisioner 56, such as via an application programming interface, to cause the provisioner 56 to install an operating system 58 on the disk 42-1 of the computing device 16-1. The information may include, for example, computing device information that identifies the computing device 16-1, an operating system identifier that identifies a particular operating system to be installed on the computing device 16-1, such as Red Hat Linux, a disk identifier identifying the disk 42-1 of the computing device 16-1 on which to install the operating system, and password authentication information associated with the computing device 16-1. Some or all of this information may have been obtained from the allocation configuration 46-1. An operating system 60 may be initiated in the memory 22 of the computing device 16-1.

The bare metal installer 28 utilizes the IPAM installer 52 to install IPAM services 62 on the computing device 16-1 to facilitate DNS and DHCP services for the computing devices 16-1-16-3. IPAM services 66 may be initiated in the memory 22 of the computing device 16-1.

Figure 1C:
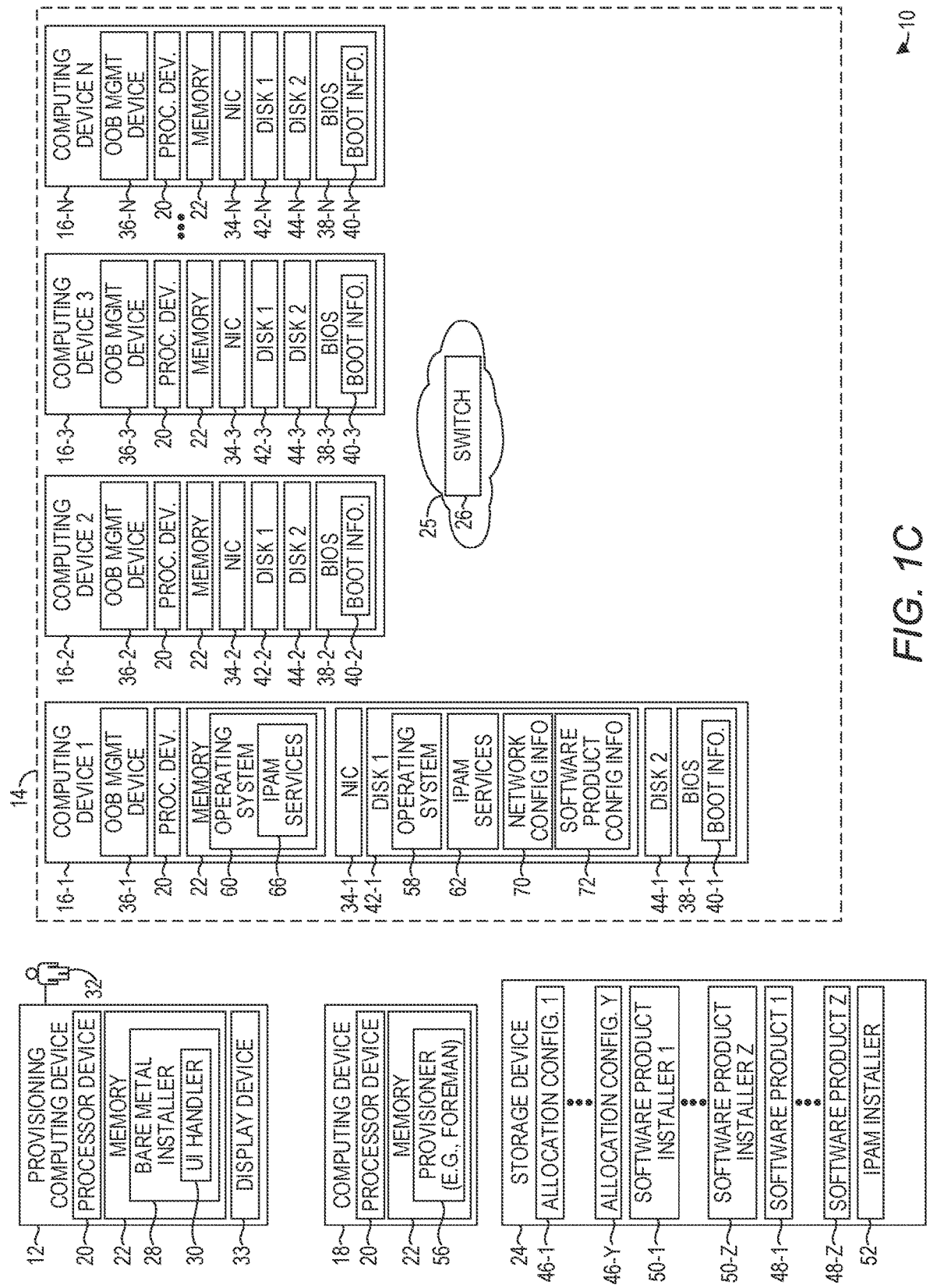

Referring now to FIG. 1C, the bare metal installer 28 generates and applies the network configuration information 70 to the computing device 16-1, such as via one or more programmatic command-line interface commands suitable for applying network policies to a computing device 16, which facilitates communications between the computing device 16-1 and the computing devices 16-2 and 16-3 via the switch 26. In some implementations, the network configuration information 70 may include iptables that implement IP packet filter rules for a firewall.

The bare metal installer 28 also generates software product configuration information 72 that is configured to be accessed by the software product installer 50-1 when installing the software product 48-1 so that the software product 48-1 is installed with the appropriate options, and so that the software product installer 50-1 has the necessary information regarding the computing devices 16-1-16-3 to successfully install the software product 48-1. The software product configuration information 72 may identify, for example, the computing devices 16-2 and 16-3, identify the network interface information necessary to communicate with the OOB management devices 36-2-36-3 and the computing devices 16-2-16-3 via the NICs 34-1-34-3. The software product configuration information 72 may also include software product customization information that identifies one or more configuration options for the software product 48-1. In this example, the software product 48-1 utilizes two different types of nodes, controller nodes and worker nodes, to implement the functionality of the software product 48-1 when executing. Examples of such software products may include, by way of non-limiting example, the Red Hat OpenShift platform software product, available at openshift.com, and the Red Hat OpenStack platform software product available at www.redhat.com. The bare metal installer 28 may identify each of the computing devices 16-1, 16-2, and 16-3 as either a worker node computing device 16 or a controller node computing device 16, and store such information in the software product configuration information 72 so that, during installation of the software product 48-1, the software product installer 50-1 installs the appropriate worker node or controller node software on the designated computing device 16.

The bare metal installer 28 may determine which computing devices 16-1-16-3 to designate as a worker node computing device 16 or a controller node computing device 16 randomly, or based on some criteria, such as capability metrics of the computing devices 16-1, 16-2, and 16-3 based on the information in the allocation configuration 46-1 regarding the processor devices 20, the memories 22, and the disks 42 and 44 of each of the computing devices 16-1, 16-2, and 16-3. The bare metal installer 28 may designate the computing device 16 having the greatest capability metric as the controller node computing device 16 and the other computing devices 16 as worker node computing devices 16. In some implementations, the user 32 may provide, via a user interface, information that identifies which computing devices 16 are to be made controller node computing devices 16 and which computing devices 16 are to be made worker node computing devices 16.

The bare metal installer 28 modifies the boot information 40-2 and 40-3 on the computing devices 16-2 and 16-3 to modify a boot process order of the computing devices 16-2 and 16-3 to receive boot operating system information from the computing device 16-1 via the network 25 during corresponding boot operations of the computing devices 16-2 and 16-3.

Figure 1D:
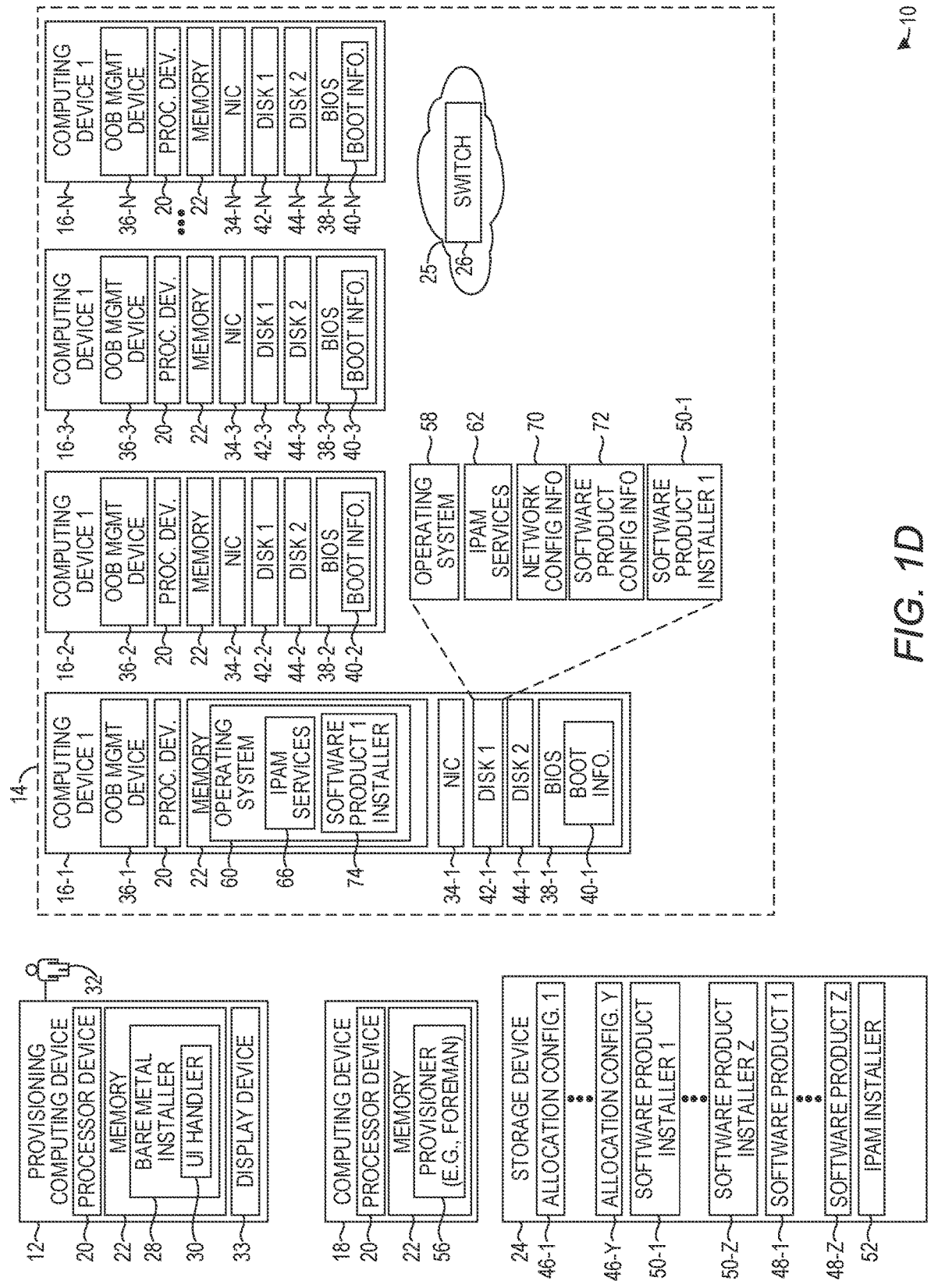

Referring now to FIG. 1D, the bare metal installer 28 causes the software product installer 50-1 to be installed on the computing device 16-1. The bare metal installer 28 may itself install the software product installer 50-1 on the computing device 16-1 or may interact with the provisioner 56 to cause the provisioner 56 to install the software product installer 50-1 on the computing device 16-1. The bare metal installer 28 may then initiate the software product installer 50-1 as a software installer process 74 to install the software product on the computing devices 16-1-16-3. The software installer process 74 then accesses the network configuration information 70 and the software product configuration information 72 and installs the software product 48-1 on the computing devices 16-1, 16-2, and 16-3, and, in this example, installs software appropriate to make the computing device 16-1 a controller node, and the computing devices 16-2 and 16-3 worker node computing devices.

Among other advantages, the examples disclosed herein eliminate a need for a user to understand complex networking issues and complex command-line interface commands that would otherwise be necessary to learn in order to install a complex software product on multiple bare metal machines. The examples also eliminate the potential for inadvertent mistakes that can be difficult to diagnose during a complex software product installation process. The examples facilitate a completely automated mechanism wherein multiple different users, such as software engineers responsible for testing complex software products, can each have a subset of computing devices that can be rapidly and reliably provisioned with any different version of any complex software product rapidly and reliably with a minimum amount of information and effort from the user.

Figure 2:
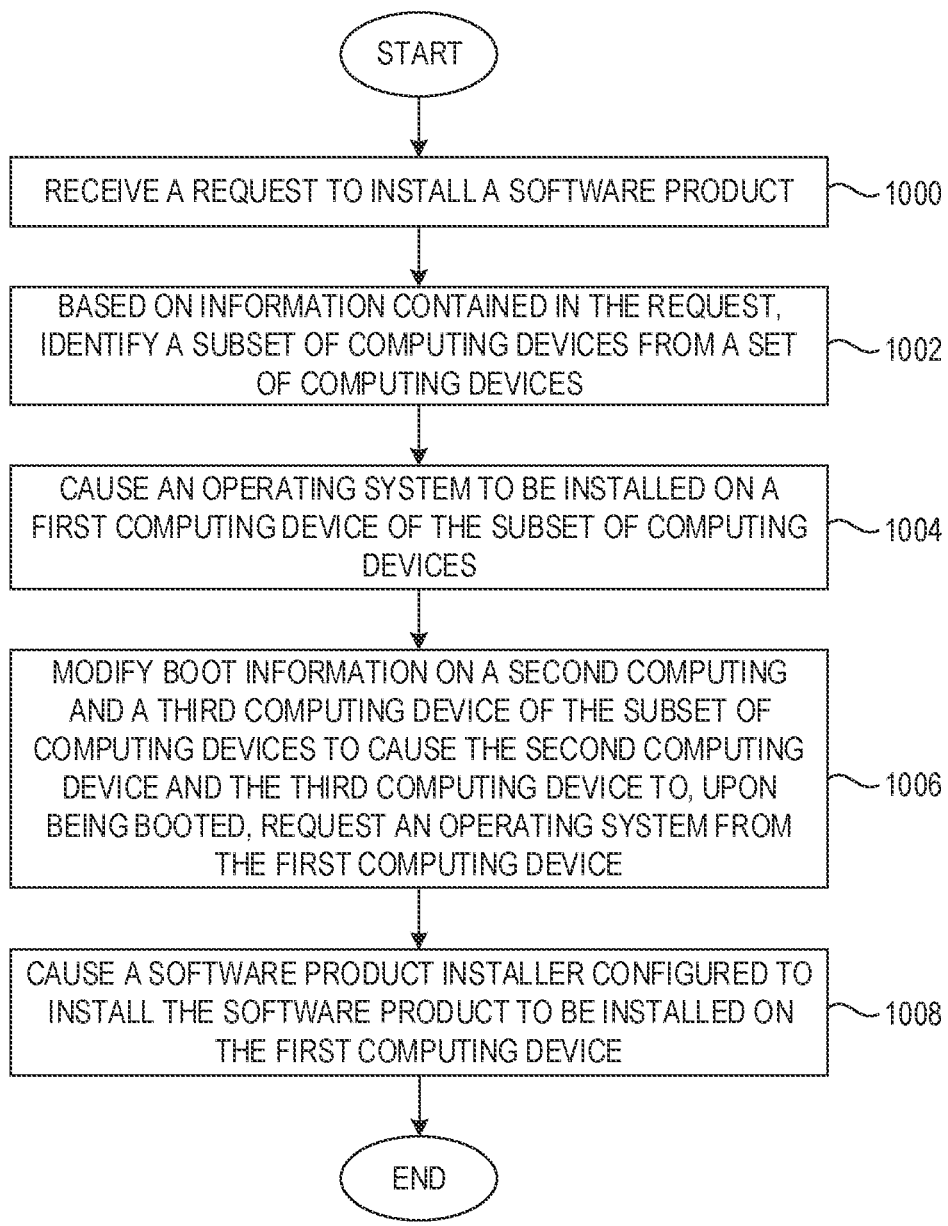
FIG. 2 is a flowchart of a method for provisioning bare metal machines with a complex software product according to one implementation.

FIG. 2 is a flowchart of a method for provisioning bare metal machines with a complex software product according to one implementation. FIG. 2 will be discussed in conjunction with FIG. 1. The bare metal installer 28 receives a request to install the software product 48-1 (FIG. 2, block 1000). The bare metal installer 28, based on information contained in the request, identifies the subset of computing devices 16-1-16-3 from the set 14 of computing devices 16-1-16-N (FIG. 2, block 1002). The bare metal installer 28 causes the operating system 58 to be installed on the computing device 16-1 (FIG. 2, block 1004). The bare metal installer 28 modifies the boot information 40-2-40-3 on the computing devices 16-2 and 16-3 to cause the computing devices 16-2 and 16-3 to, upon being booted, request an operating system from the computing device 16-1 (FIG. 2, block 1006). The bare metal installer 28 causes the software product installer 50-1 that is configured to install the software product 48-1 to be installed on the computing device 16-1 (FIG. 2, block 1008).

Figure 3:
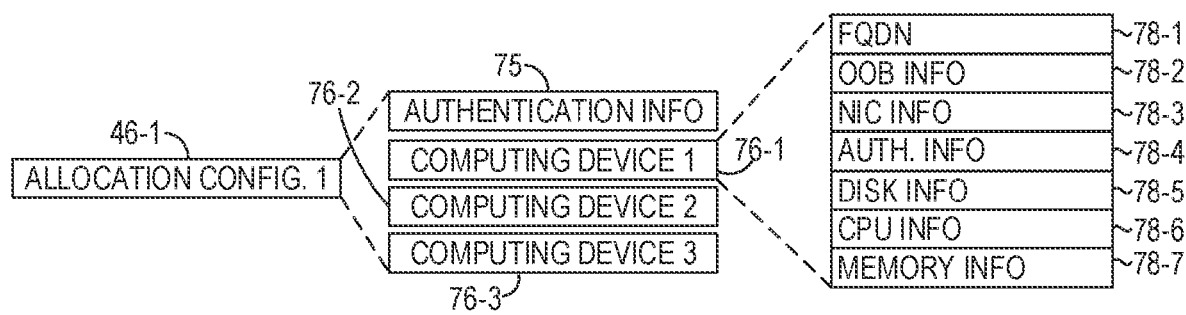
FIG. 3 is a block diagram of an allocation configuration according to one implementation.

FIG. 3 is a block diagram of the allocation configuration 46-1 according to one implementation. The allocation configuration 46-1 includes an authentication record 75 which contains authentication information for use in authenticating a request that identifies the allocation configuration 46-1. The allocation configuration 46-1 includes three records 76-1-76-3, each of which corresponds to one of the computing devices 16-1-16-3. The record 76-1 includes multiple fields 78. A field 78-1 identifies the fully qualified domain name of the computing device 16-1. A field 78-2 contains information about the OOB management device 36-1 which is associated with the computing device 16-1, such as the MAC address or other communications address of the OOB management device 36-1. A field 78-3 contains information about the NIC 34-1, such as the MAC address of the NIC 34-1. A field 78-4 contains authentication information for the computing device 16-1, such as authentication credentials that must be provided to the computing device 16-1 by the software product installer 50-1 in order to install the appropriate software components of the software product 48-1 on the disks 42-1 and/or 44-1. A field 78-5 contains information about the disks 42-1 and 44-1, such as the type of disk, amount of storage available, and the like. A field 78-6 contains information about the processor device 20 of the computing device 16-1, such as the type of processor device, speed of the processor device 20, model of the processor device 20, and the like. A field 78-7 contains information about the memory 22 of the computing device 16-1, such as the type of memory 22, amount of memory 22, speed of the memory 22, and the like. The records 76-2 and 76-3 contain substantially similar fields that identify corresponding attributes of the computing devices 16-2 and 16-3, respectively.

Figure 4:
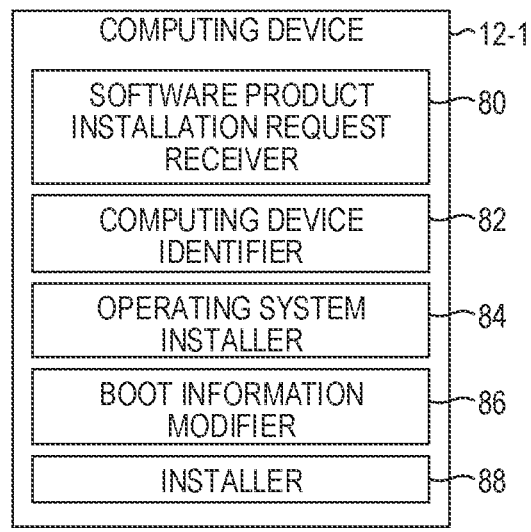
FIG. 4 is a block diagram of a computing device suitable for implementing aspects illustrated in FIGS. 1A-1D according to one implementation.

FIG. 4 is a block diagram of a computing device 12-1 according to another implementation. The computing device 12-1 implements identical functionality as that described above with regard to the provisioning computing device 12. The computing device 12-1 includes a software product installation request receiver 80 that is configured to receive a request to install a software product. The software product installation request receiver 80 may comprise executable software instructions configured to program a processor device to implement the functionality of receiving a request to install a software product, may comprise circuitry including, by way of non-limiting example, an application-specific integrated circuit (ASIC), field-programmable gate array (FPGA), or may comprise a combination of executable software instructions and circuitry. In some implementations, the software product installation request receiver 80 may be implemented by the UI handler 30, as discussed in greater detail below. In other implementations, the software product installation request receiver 80 may access a file that contains the request to install a software product. In some implementations, the software product installation request receiver 80 may receive the request from a scheduler that provides the request to install a software product to the software product installation request receiver 80 at a scheduled time and date. In some implementations, the software product installation request receiver 80 may receive the request in run-time variables provided to the bare metal installer 28 at initiation time of the bare metal installer 28.

The computing device 12-1 also includes a computing device identifier 82 that is configured to, based on information contained in the request, identify a subset of computing devices from a set of computing devices. In some implementations, the request may contain information that identifies an allocation configuration, and the computing device identifier 82 may identify the subset of computing devices based on the information in the allocation configuration. In some implementations, the request may specifically identify the subset of computing devices. The computing device identifier 82 may comprise executable software instructions configured to program a processor device to implement the functionality of, based on information contained in the request, identifying the subset of computing devices from the set of computing devices, may comprise circuitry including, by way of non-limiting example, an ASIC, FPGA, or may comprise a combination of executable software instructions and circuitry.

The computing device 12-1 also includes an operating system installer 84 that is configured to cause an operating system to be installed on a first computing device of the subset of computing devices. In some implementations, the operating system installer 84 may directly install the operating system on the first computing device. In other implementations, the operating system installer 84 may interact with another process, such as the provisioner 56, to cause the provisioner 56 to install the operating system on the first computing device. The operating system installer 84 may comprise executable software instructions to program a processor device to implement the functionality of causing an operating system to be installed on the first computing device of the subset of computing devices, may comprise circuitry including, by way of non-limiting example, an ASIC, FPGA, or may comprise a combination of executable software instructions and circuitry.

The computing device 12-1 also includes a boot information modifier 86 that is configured to modify boot information on a second computing device of the subset of computing devices to cause the second computing device to, upon being booted, request an operating system from the first computing device. The boot information modifier 86 may comprise executable software instructions to program a processor device to implement the functionality of modifying boot information on the second computing device of the subset of computing devices to cause the second computing device to, upon being booted, request an operating system from the first computing device, may comprise circuitry including, by way of non-limiting example, an ASIC, FPGA, or may comprise a combination of executable software instructions and circuitry.

The computing device 12-1 also includes an installer 88 that is configured to cause a software product installer configured to install the software product to be installed on the first computing device. The installer 88 may comprise executable software instructions to program a processor device to implement the functionality of causing the software product installer configured to install the software product to be installed on the first computing device, may comprise circuitry including, by way of non-limiting example, an ASIC, FPGA, or may comprise a combination of executable software instructions and circuitry.

Figure 5:
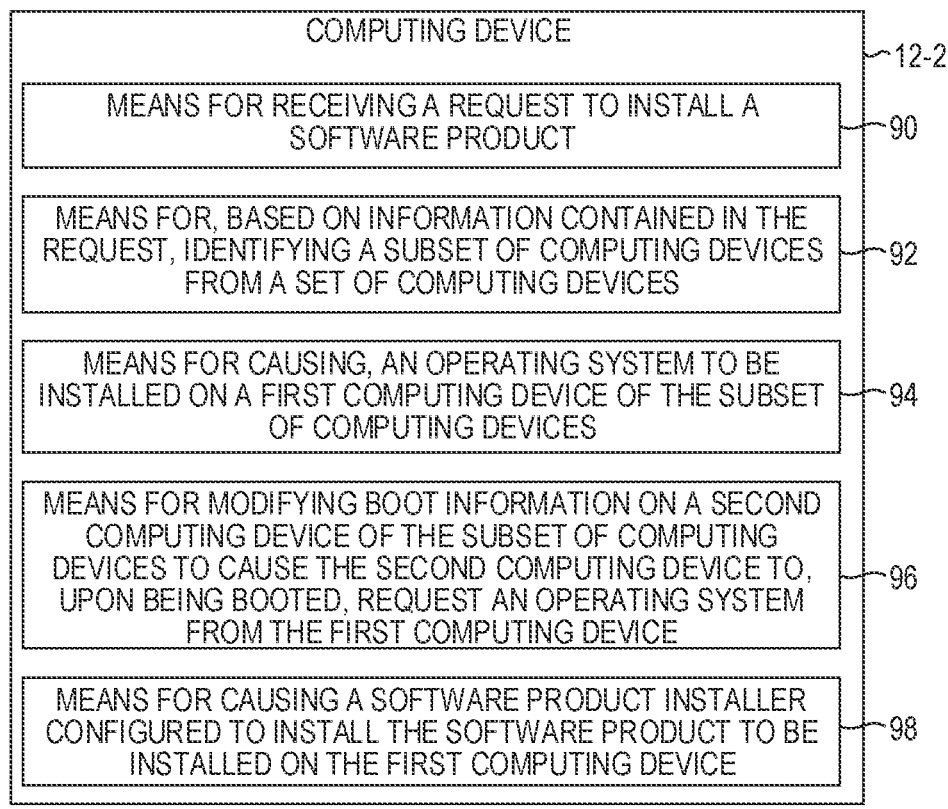
FIG. 5 is a block diagram of a computing device suitable for implementing aspects illustrated in FIGS. 1A-1D according to another implementation.

FIG. 5 is a block diagram of a computing device 12-2 according to additional implementations. The computing device 12-2 implements identical functionality as that described above with regard to the provisioning computing device 12. In this implementation, the computing device 12-2 includes a means 90 for receiving a request to install a software product. The means 90 may be implemented in any number of manners, including, for example, via the software product installation request receiver 80 illustrated in FIG. 4.

The computing device 12-2 also includes a means 92 for, based on information contained in the request, identifying a subset of computing devices from a set of computing devices. The means 92 may be implemented in any number of manners, including, for example, via the computing device identifier 82 illustrated in FIG. 4.

The computing device 12-2 also includes a means 94 for causing an operating system to be installed on a first computing device of the subset of computing devices. The means 94 may be implemented in any number of manners, including, for example, via the operating system installer 84 illustrated in FIG. 4.

The computing device 12-2 also includes a means 96 for modifying boot information on a second computing device of the subset of computing devices to cause the second computing device to, upon being booted, request an operating system from the first computing device. The means 96 may be implemented in any number of manners, including, for example, via the boot information modifier 86 illustrated in FIG. 4. The computing device 12-2 also includes a means 98 for causing a software product installer configured to install the software product to be installed on the first computing device. The means 98 may be implemented in any number of manners, including, for example, via the installer 88 illustrated in FIG. 4.

Figure 6A:
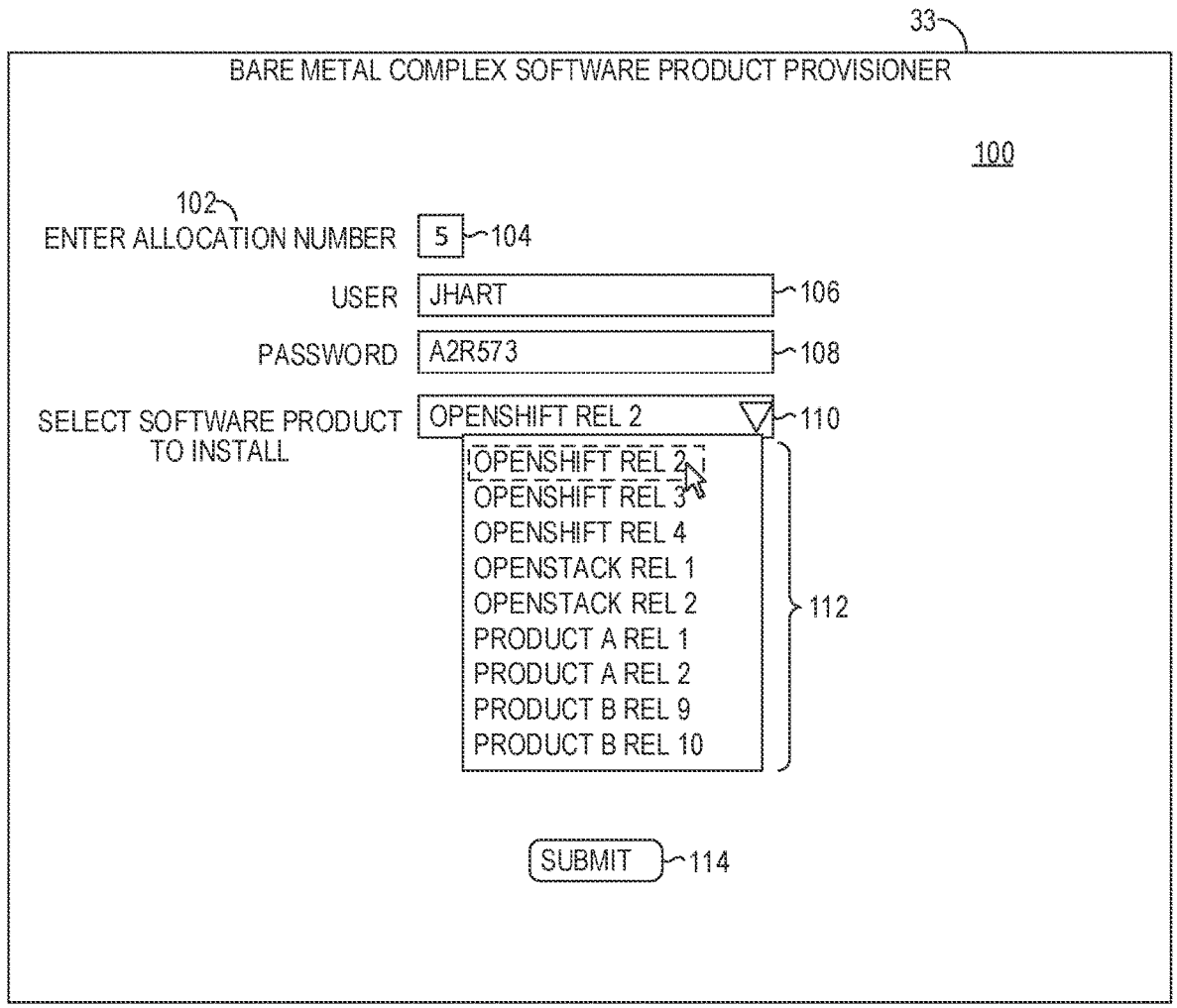
FIG. 6A illustrates a user interface of a bare metal installer according to one implementation.

FIG. 6A illustrates a user interface 100 of the bare metal installer 28, according to one implementation. In this example, upon initiation of the bare metal installer 28, the UI handler 30 presents the user interface 100 on the display device 33. The user interface 100 comprises imagery that depicts information 102 requesting identification of an allocation configuration identifier, and an allocation configuration identifier control 104 via which the user 32 may enter a particular allocation configuration identifier, in this example, the numeral 5. The user interface 100 includes a user control 106 via which the user 32 may enter a user identifier, in this example, JHART. The user interface 100 includes an authentication information control 108 via which the user 32 may enter authentication information, such as a password, in this example, A2R573. The user interface 100 includes a software product control 110 via which a plurality of software product names 112 may be presented on the display device 33. The user 32 may then select a particular software product and a particular version from the scrollable list of software product names 112 to be installed on a subset of the computing devices 16. The user 32 may then select a control 114 to provide the information to the bare metal installer 28 via the UI handler 30.

The bare metal installer 28 receives the information provided by the user 32 to the UI handler 30 via the user interface 100. The bare metal installer 28 accesses the allocation configuration 46 that corresponds to the allocation configuration identifier provided by the user 32 and ensures that the authentication information in the allocation configuration 46 matches the authentication information provided by the user 32. The allocation configuration 46 identifies a subset of six computing devices 16 of the set 14 of computing devices 16.

Referring now to FIG. 6B, the UI handler 30 updates the user interface 100 with imagery that includes computing device identifiers 116 that identify the subset of computing devices 16 identified in the allocation configuration 46. The imagery also includes a plurality of controls 118 via which the user 32 may choose which computing device 16 is to be the boot strap node computing device 16, and which computing devices 16 are to be controller node computing devices 16 and worker node computing devices 16 when the software product is installed. In this implementation, the selected boot strap node computing device 16 installs the complex software product on the other computing devices 16 but does not install the complex software product on itself. The user 32 may select or hover a cursor 120 over a particular computing device identifier, and in response, the UI handler 30 accesses the allocation configuration 46 to determine metrics of the computing device 16 that corresponds to the selected computing device identifier. The UI handler 30 generates a control 122 that identifies the metrics of the computing device 16, such as the type of processor device, the type and amount of memory, and the type and size of the disks. The user 32 may then utilize such information to determine which computing devices 16 should be designated as controller node computing devices 16, which computing devices 16 should be designated as worker node computing devices 16 and which computing device 16 should be designated as the bootstrap node computing device 16. In this example, the user 32 has designated three computing devices 16 as controller node computing devices 16 and two computing devices 16 as worker node computing devices 16. The imagery includes a software product customization information control 124 via which the user 32 may enter additional configuration options associated with the installation of and/or environment of the software product. The user 32 may then select the control 114 to provide the information to the bare metal installer 28 via the UI handler 30.

The bare metal installer 28 receives the information provided by the user 32, and provisions the subset of six computing devices 16 in the manner discussed above with regard to FIGS. 1A-1D and FIG. 2 based on the information provided by the user 32.

Figure 7:
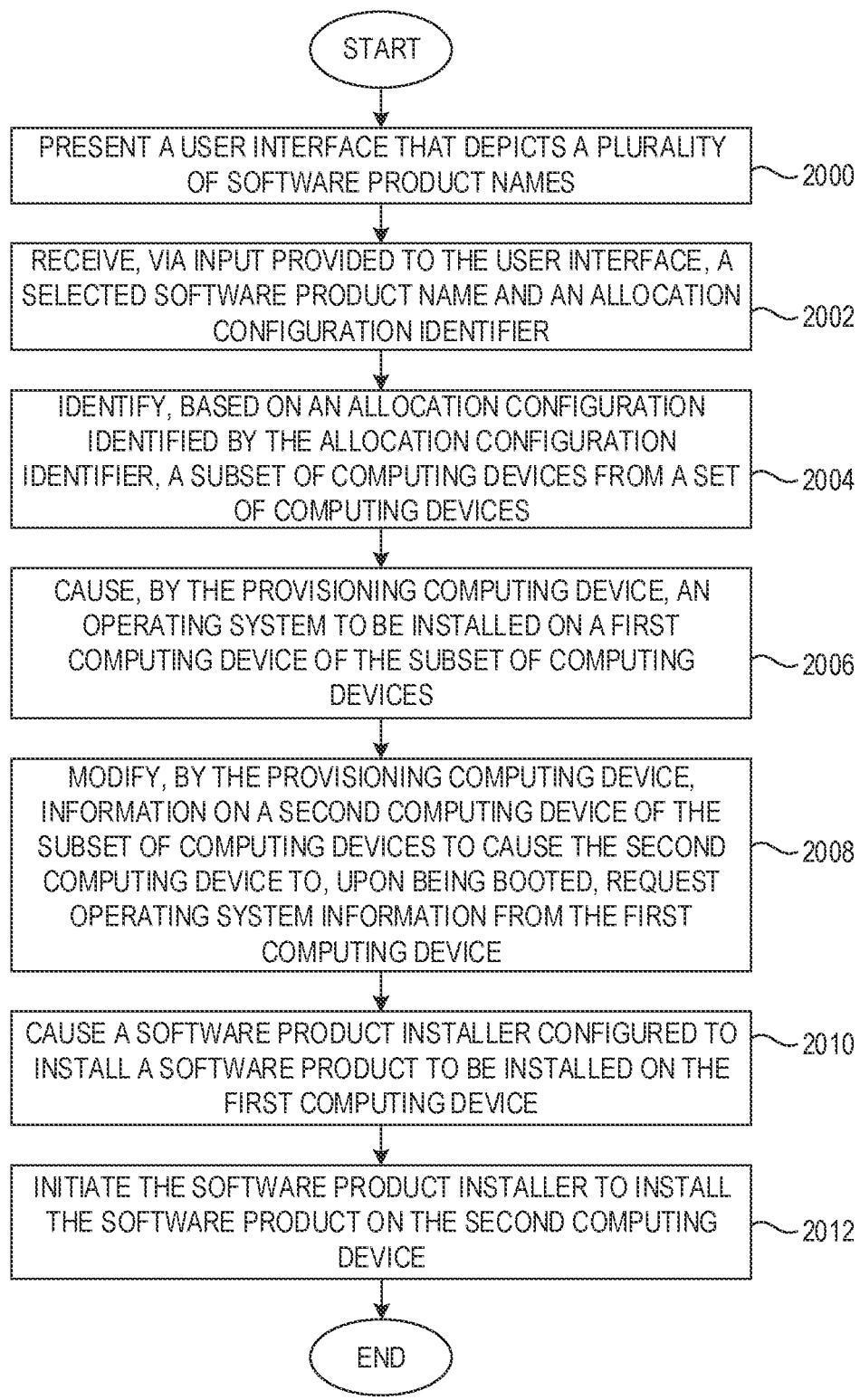
FIG. 7 is a flowchart of a method for provisioning bare metal machines with a complex software product based on information provided via a user interface according to one implementation.

FIG. 7 is a flowchart of a method for provisioning bare metal machines with a complex software product based on information provided via the user interface 100 according to one implementation. FIG. 7 will be discussed in conjunction with FIGS. 6A-6B. The computing device 12 provides the user interface 100 on the display device 33 that depicts the plurality of software product names 112 (FIG. 7, block 2000). The computing device 12 receives, via input provided to the user interface 100, a selected software product name 112 and an allocation configuration identifier (FIG. 7, block 2002). The computing device 12 identifies, based on the allocation configuration 46 identified by the allocation configuration identifier, the subset of five computing devices 16 from the set 14 of computing devices 16 (FIG. 7, block 2004). The computing device 12 causes an operating system to be installed on a first computing device 16 of the subset of computing devices 16 (FIG. 7, block 2006). The computing device 12 modifies information on the five other computing devices 16 of the subset of computing devices 16 to cause the five other computing devices 16 to, upon being booted, request operating system information from the first computing device 16 (FIG. 7, block 2008). The computing device 12 causes a software product installer 50 configured to install the selected software product 48 to be installed on the first computing device 16 (FIG. 7, block 2010). The computing device 12 initiates the software product installer 50 to install the software product 48 on the subset of five computing devices 16 (FIG. 7, block 2012).

Figure 8:
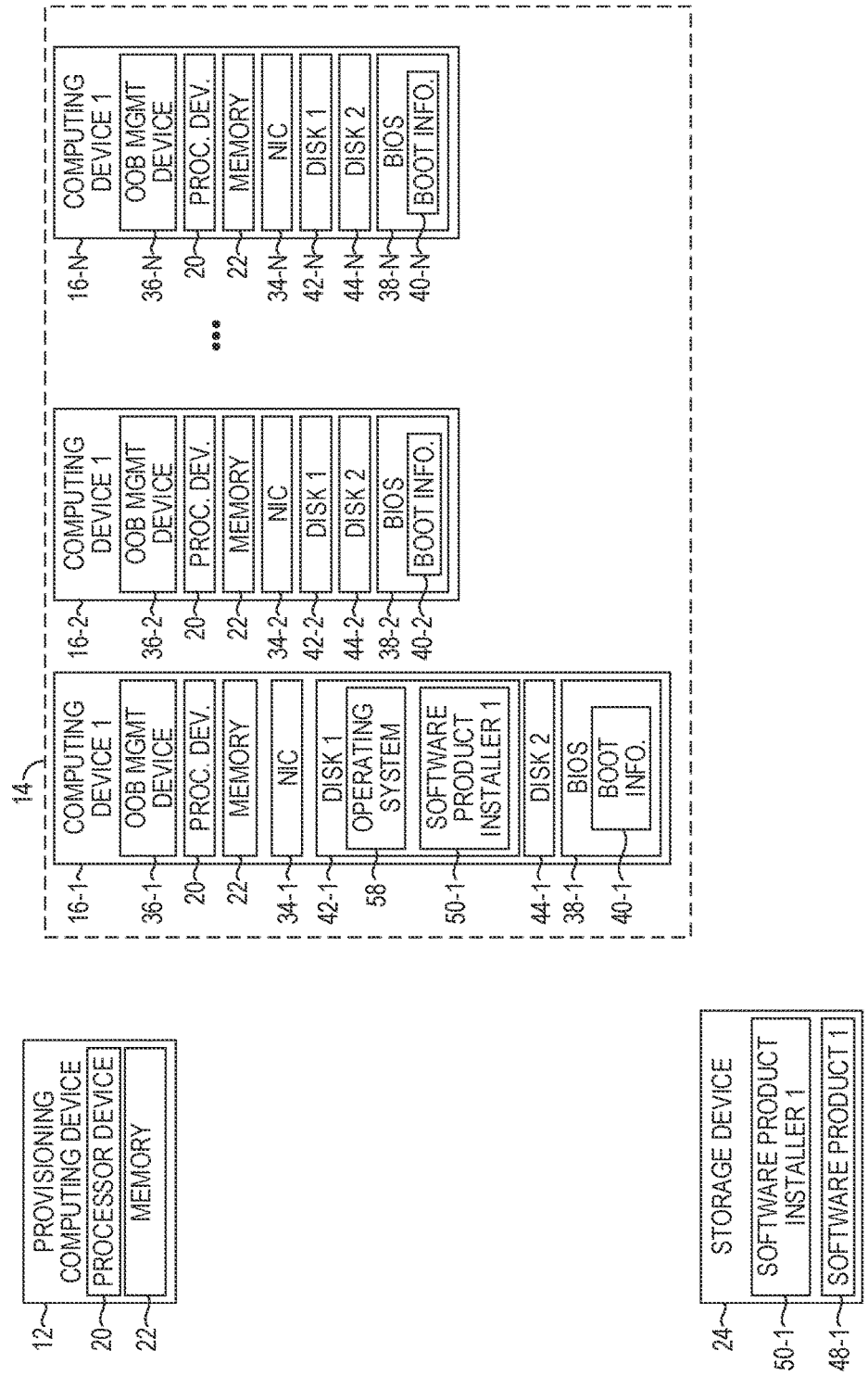
FIG. 8 is a simplified block diagram of the environment illustrated in FIGS. 1A-1D according to one implementation.

FIG. 8 is a simplified block diagram of the environment 10 illustrated in FIGS. 1A-1D according to one implementation. The environment 10 includes the computing device 12, which includes the memory 22 and the processor device 20 coupled to the memory 22. The processor device 20 is to receive a request to install a software product 48-1. The processor device 20 is further to, based on information contained in the request, identify the subset of computing devices 16 from the set 14 of computing devices 16. The processor device 20 is further to cause the operating system 58 to be installed on the computing device 16-1 of the subset of computing devices 16. The processor device 20 is further to modify the boot information 40-2 on the second computing device 16-2 of the subset of computing devices 16 to, upon being booted, request an operating system from the computing device 16-1. The processor device 20 is further to cause the software product installer 50-1 configured to install the software product 48-1 to be installed on the computing device 16-1. The processor device 20 is further to initiate the software product installer 50-1 to install the software product 48-1 on the subset of computing devices 16.

Figure 9:
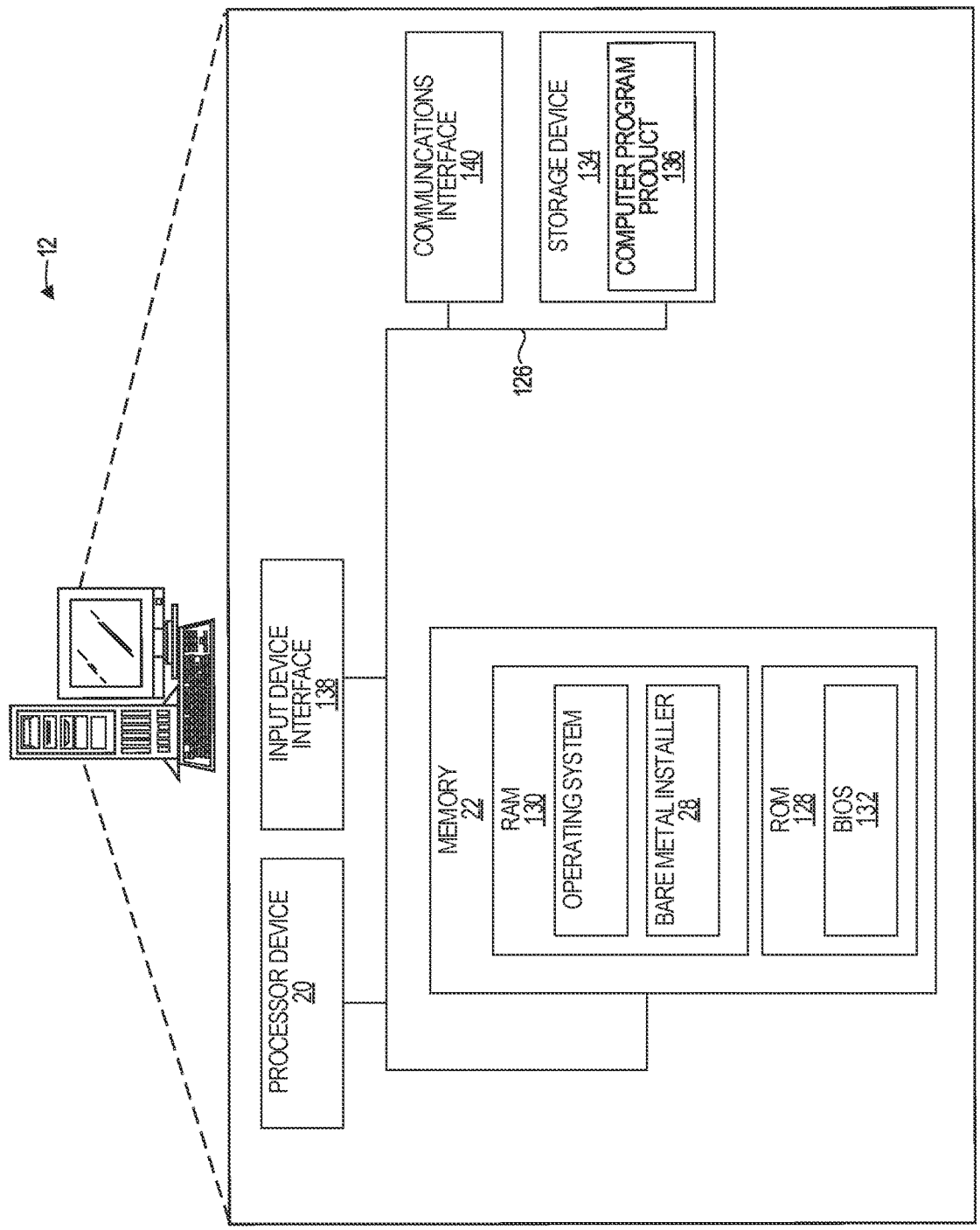
FIG. 9 is a block diagram of a computing device suitable for implementing examples disclosed herein according to one implementation.

FIG. 9 is a block diagram of the provisioning computing device 12 suitable for implementing examples according to one example. The provisioning computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The provisioning computing device 12 includes the processor device 20, the system memory 22, and a system bus 126. The system bus 126 provides an interface for system components including, but not limited to, the system memory 22 and the processor device 20. The processor device 20 can be any commercially available or proprietary processor.

The system bus 126 may be any of several types of bus structures that may further interconnect to a memory bus (with or without a memory controller), a peripheral bus, and/or a local bus using any of a variety of commercially available bus architectures. The system memory 22 may include non-volatile memory 128 (e.g., read-only memory (ROM), erasable programmable read-only memory (EPROM), electrically erasable programmable read-only memory (EEPROM), etc.), and volatile memory 130 (e.g., random-access memory (RAM)). A basic input/output system (BIOS) 132 may be stored in the non-volatile memory 128 and can include the basic routines that help to transfer information between elements within the provisioning computing device 12. The volatile memory 130 may also include a high-speed RAM, such as static RAM, for caching data.

The provisioning computing device 12 may further include or be coupled to a non-transitory computer-readable storage medium such as a storage device 134, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, an SSD drive, or the like. The storage device 134 and other drives associated with computer-readable media and computer-usable media may provide non-volatile storage of data, data structures, computer-executable instructions, and the like.

A number of modules can be stored in the storage device 134 and in the volatile memory 130, including an operating system and one or more program modules, such as the bare metal installer 28, which may implement the functionality described herein in whole or in part. It is to be appreciated that the examples can be implemented with various commercially available operating systems or combinations of operating systems.

All or a portion of the examples may be implemented as a computer program product 136 stored on a transitory or non-transitory computer-usable or computer-readable storage medium, such as the storage device 134, which includes complex programming instructions, such as complex computer-readable program code, to cause the processor device 20 to carry out the steps described herein. Thus, the computer-readable program code can comprise software instructions for implementing the functionality of the examples described herein when executed on the processor device 20. The processor device 20, in conjunction with the bare metal installer 28 in the volatile memory 130, may serve as a controller, or control system, for the provisioning computing device 12 that is to implement the functionality described herein.

An operator, such as the user 32, may also be able to enter one or more configuration commands through a keyboard (not illustrated), a pointing device such as a mouse (not illustrated), or a touch-sensitive surface such as the display device 33. Such input devices may be connected to the processor device 20 through an input device interface 138 that is coupled to the system bus 126 but can be connected by other interfaces such as a parallel port, an Institute of Electrical and Electronic Engineers (IEEE) 1394 serial port, a Universal Serial Bus (USB) port, an IR interface, and the like.

The provisioning computing device 12 may also include a communications interface 140, such as an Ethernet transceiver or the like, suitable for communicating with the network 25 as appropriate or desired.

Other computer system designs and configurations may also be suitable to implement the systems and methods described herein. The following examples illustrate various additional implementations in accordance with one or more aspects of the disclosure.

Example 1 is a computing device that includes a means for receiving a request to install a software product; a means for, based on information contained in the request, identifying a subset of computing devices from a set of computing devices; a means for causing an operating system to be installed on a first computing device of the subset of computing devices; a means for modifying boot information on a second computing device of the subset of computing devices to cause the second computing device to, upon being booted, request an operating system from the first computing device; and a means for causing a software product installer configured to install the software product to be installed on the first computing device.

Example 2 is the computing device of example 1, wherein the software product comprises one of the Red Hat OpenShift platform and the Red Hat OpenStack platform.

Example 3 is a computing device that includes a product installation request receiver that is configured to receive a request to install a software product; a computing device identifier that is configured to, based on information contained in the request, identify a subset of computing devices from a set of computing devices; an operating system installer that is configured to cause an operating system to be installed on a first computing device of the subset of computing devices; a boot information modifier that is configured to modify boot information on a second computing device of the subset of computing devices to cause the second computing device to, upon being booted, request an operating system from the first computing device; and an installer that is configured to cause a software product installer configured to install the software product to be installed on the first computing device.

Example 4 is the computing device of example 3 wherein the software product requires at least one computing device of the subset of computing devices to be a controller node computing device, and requires at least one other computing device of the subset of computing devices to be a worker node computing device.

Example 5 is a method comprising presenting, by a provisioning computing device on a display device, a user interface that depicts a plurality of software product names; receiving, by the provisioning computing device via input provided to the user interface, a selected software product name and an allocation configuration identifier; identifying, based on an allocation configuration identified by the allocation configuration identifier, a subset of computing devices from a set of computing devices; causing, by the provisioning computing device, an operating system to be installed on a first computing device of the subset of computing devices; modifying, by the provisioning computing device, information on a second computing device of the subset of computing devices to cause the second computing device to, upon being booted, request operating system information from the first computing device; causing a software product installer configured to install a software product to be installed on the first computing device; and initiating the software product installer to install the software product on the subset of computing devices.

Example 6 is the method of example 5 wherein the user interface includes information requesting identification of the allocation configuration identifier.

Example 7 is the method of example 5 wherein the user interface includes a user control that requests a user identifier, and an authentication information control requesting authentication information associated with a user.

Example 8 is the method of example 7 further including receiving, by the provisioning computing device via the user interface, a user identifier and authentication information; and determining, based at least in part on the user identifier and the authentication information, that the user is authorized to select the allocation configuration identified by the allocation configuration identifier.

Example 9 is the method of example 5 further including receiving, via the user interface, configuration information that corresponds to the software product; generating software product configuration information based on the configuration information; and storing the software product configuration information on the first computing device for access by the software product installer.

Example 10 is the method of example 5 further including updating, by the provisioning computing device, the user interface to identify the computing devices in the subset of computing devices; and receiving, via the user interface, controller node input that identifies one or more of the computing devices in the subset of computing devices as controller node computing devices and worker node input that identifies one or more of the computing devices in the subset of computing devices as worker node computing devices.

Example 11 is the method of example 10 further including based on the controller node input and the worker node input, storing, on the first computing device, information configured to be accessed by the software product installer that identifies the one or more of the computing devices in the subset of computing devices as controller node computing devices and worker node input that identifies one or more of the computing devices in the subset of computing devices as worker node computing devices.

Example 12 is a provisioning computing device, including a memory; and a processor device coupled to the memory to present, on a display device, a user interface that depicts a plurality of software product names; receive, via input provided to the user interface, a selected software product name and an allocation configuration identifier; identify, based on an allocation configuration identified by the allocation configuration identifier, a subset of computing devices from a set of computing devices; cause an operating system to be installed on a first computing device of the subset of computing devices; modify information on a second computing device of the subset of computing devices to cause the second computing device to, upon being booted, request operating system information from the first computing device; cause a software product installer configured to install a software product to be installed on the first computing device; and initiate the software product installer to install the software product on the subset of computing devices.

Example 13 is the provisioning computing device of example 12 wherein the user interface includes information requesting identification of the allocation configuration identifier.

Example 14 is the provisioning computing device of example 12 wherein the user interface includes a user control that requests a user identifier, and an authentication information control requesting authentication information associated with a user.

Example 15 is the provisioning computing device of example 12 wherein the processor device is further to update the user interface to identify the computing devices in the subset of computing devices; and receive, via the user interface, controller node input that identifies one or more of the computing devices in the subset of computing devices as controller node computing devices and worker node input that identifies one or more of the computing devices in the subset of computing devices as worker node computing devices.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a bare metal installer executing on a processor device, a request to install a software product, wherein the request identifies a particular software product of a plurality of different software products, wherein the particular software product, when executing on an operating system, requires a worker node computing device and a controller node computing device configured to allocate work of the particular software product to the worker node computing device;
   accessing, by the bare metal installer from a storage device, an allocation configuration of a plurality of allocation configurations, the allocation configuration identifying a subset of computing devices from a plurality of computing devices;
   based on information contained in the request and the allocation configuration, identifying, by the bare metal installer, a first computing device of the subset of computing devices as the controller node computing device and a second computing device of the subset of computing devices as the worker node computing device;
   selecting, by the bare metal installer, a software product installer from a plurality of software product installers based on the particular software product identified in the request;
   causing, by the bare metal installer, the operating system to be installed on the first computing device;
   generating, by the bare metal installer, software product configuration information configured to be accessed by the software product installer prior to installing the particular software product, the software product configuration information comprising a controller node configuration for installation of the particular software product to the first computing device, and a worker node configuration for installation of the particular software product to the second computing device;
   modifying, by the bare metal installer, boot information on the second computing device of the subset of computing devices to cause the second computing device to, upon being booted, request the operating system from the first computing device; and
   causing, by the bare metal installer, the software product installer configured to install the particular software product to be installed on the first computing device based on the controller node configuration.

2. The method of claim 1 wherein the request includes allocation information that identifies the allocation configuration.

3. The method of claim 1 wherein the allocation configuration identifies, for each computing device in the subset of computing devices, a corresponding network interface identifier that identifies a corresponding network interface via which a corresponding computing device of the subset of computing devices communicates with a network.

4. The method of claim 1 wherein the allocation configuration identifies, for each computing device in the subset of computing devices, a corresponding out-of-band (OOB) interface address that identifies an OOB management device for a corresponding computing device, each OOB management device configured to cause the corresponding computing device to restart upon request.

5. The method of claim 1 wherein the allocation configuration identifies, for each computing device in the subset of computing devices, a fully qualified domain name of a corresponding computing device.

6. The method of claim 1 wherein the request includes information that identifies a particular version of the particular software product of a plurality of different versions of the particular software product, and wherein causing the software product installer configured to install the particular software product to be installed on the first computing device further comprises selecting a particular software product installer of a plurality of software product installers based on the particular version.

7. The method of claim 1 wherein causing the operating system to be installed on the first computing device comprises causing a software provisioner to install the operating system on the first computing device.

8. The method of claim 7 further comprising sending to the software provisioner:
computing device information that identifies the first computing device; an operating system identifier that identifies a particular operating system to be installed on the first computing device; a disk identifier identifying a disk of the first computing device on which to install the operating system; and password authentication information associated with the first computing device.

9. The method of claim 1 further comprising installing, by the bare metal installer, internet protocol (IP) address management (IPAM) services on the first computing device.

10. The method of claim 1 further comprising:
installing, by the bare metal installer, network configuration information, including network policies, on the first computing device that is configured to facilitate communications between the first computing device and the second computing device via a network.

11. The method of claim 1 wherein identifying the first computing device of the subset of computing devices as the controller node computing device and the second computing device of the subset of computing devices as the worker node computing device comprises:
storing, on the first computing device, information configured to be accessed by the software product installer that identifies the first computing device as the controller node computing device and the second computing device as the worker node computing device.

12. The method of claim 11 further comprising:
accessing information associated with each computing device of the subset of computing devices that identifies capability metrics of each computing device; and
selecting the first computing device as the controller node computing device based on the controller node computing device having a greatest capability metric.

13. The method of claim 1 wherein the subset of computing devices includes a third computing device, a fourth computing device, and a fifth computing device, and further comprising:
modifying, by the bare metal installer, boot information on the third computing device, the fourth computing device, and the fifth computing device of the subset of computing devices to, upon being booted, request the operating system from the first computing device;
determining, by the bare metal installer, to designate the second computing device, the third computing device, and the fourth computing device as worker node computing devices;
determining, by the bare metal installer, to designate the first computing device as the controller node computing device; and
storing, on the first computing device, information configured to be accessed by the software product installer that identifies the second computing device, the third computing device, and the fourth computing device as the worker node computing devices and the first computing device as the controller node computing device.

14. The method of claim 1 wherein the request includes software product customization information that identifies one or more configuration options for the particular software product, and further comprising installing, by the bare metal installer, the software product configuration information that identifies the one or more configuration options for the particular software product.

15. The method of claim 1 wherein modifying the boot information on the second computing device comprises modifying a boot process order of the second computing device to receive boot operating system information from the first computing device via a network during corresponding boot operations of the second computing device.

16. The method of claim 1 further comprising initiating the software product installer to install the particular software product on the second computing device based on the software product configuration information.

17. The method of claim 1 wherein the allocation configuration comprises an authentication record and a plurality of records, each record of the plurality of records corresponding to a computing device of the subset of computing devices.

18. A computing device, comprising:
a memory; and
a processor device coupled to the memory to:
receive a request to install a software product, wherein the request identifies a particular software product of a plurality of different software products, wherein the particular software product, when executing on an operating system, requires a worker node computing device and a controller node computing device configured to allocate work of the particular software product to the worker node computing device;
access, from a storage device, an allocation configuration of a plurality of allocation configurations, the allocation configuration identifying a subset of computing devices from a plurality of computing devices;
based on information contained in the request and the allocation configuration, identify a first computing device of the subset of computing devices as the controller node computing device and a second computing device of the subset of computing devices as the worker node computing device;
select a software product installer from a plurality of software product installers based on the particular software product identified in the request;
cause the operating system to be installed on the first computing device;
generate software product configuration information configured to be accessed by the software product installer prior to installing the particular software product, the software product configuration information comprising a controller node configuration for installation of the particular software product to the first computing device, and a worker node configuration for installation of the particular software product to the second computing device;
modify boot information on the second computing device of the subset of computing devices to cause the second computing device to, upon being booted, request the operating system from the first computing device;
cause the software product installer configured to install the particular software product to be installed on the first computing device based on the controller node configuration; and
initiate the software product installer to install the particular software product on the subset of computing devices.

19. The computing device of claim 18 wherein the processor device is further to:
- present, on a display device, a user interface that depicts a plurality of software product names; and
- receive, via input provided to the user interface, the request, the request including a selected software product name that identifies the particular software product and an allocation configuration identifier that identifies the allocation configuration that identifies the subset of computing devices.

20. A non-transitory computer-readable storage medium that includes executable instructions to cause a processor device to:
- receive a request to install a software product, wherein the request identifies a particular software product of a plurality of different software products, wherein the particular software product, when executing on an operating system, requires a worker node computing device and a controller node computing device configured to allocate work of the software product to the worker node computing device;
- access, from a storage device, an allocation configuration of a plurality of allocation configurations, the allocation configuration identifying a subset of computing devices from a plurality of computing devices;
- based on information contained in the request and the allocation configuration, identify a first computing device of the subset of computing devices as the controller node computing device and a second computing device of the subset of computing devices as the worker node computing device;
- select a software product installer from a plurality of software product installers based on the particular software product identified in the request;
- cause the operating system to be installed on the first computing device;
- generate software product configuration information configured to be accessed by the software product installer prior to installing the particular software product, the software product configuration information comprising a controller node configuration for installation of the particular software product to the first computing device, and a worker node configuration for installation of the particular software product to the second computing device;
- modify boot information on the second computing device of the subset of computing devices to cause the second computing device to, upon being booted, request the operating system from the first computing device;
- cause the software product installer configured to install the particular software product to be installed on the first computing device based on the controller node configuration; and
- initiate the software product installer to install the software product on the subset of computing devices.

\* \* \* \* \*